United States Patent [19]

Takagi et al.

[11] Patent Number: 4,816,351
[45] Date of Patent: Mar. 28, 1989

[54] MAGNETIC RECORDING MEDIUM

[75] Inventors: Hiroshi Takagi, Yokohama; Morimi Hashimoto, Wako; Kenji Suzuki, Yokohama, all of Japan

[73] Assignee: Canon Kabushiki Kaisha, Tokyo, Japan

[21] Appl. No.: 832,723

[22] Filed: Feb. 25, 1986

[30] Foreign Application Priority Data

Feb. 26, 1985 [JP] Japan .................. 60-35316
Apr. 4, 1985 [JP] Japan .................. 60-71588

[51] Int. Cl.$^4$ .............................. G11B 5/66
[52] U.S. Cl. ............................ 428/694; 428/469
[58] Field of Search ............ 428/928, 629, 632, 668, 428/694, 611, 695, 472, 469, 458; 204/192.2; 427/132

[56] References Cited

U.S. PATENT DOCUMENTS 4,124,736 11/1978 Patel et al. ................ 428/928
4,239,835 12/1980 Iijima et al. ............... 428/928
4,539,264 9/1985 Yazawa et al. ............. 428/928
4,565,734 1/1986 Arai et al. ................. 427/132
4,610,911 9/1986 Opfer et al. ............... 428/928

FOREIGN PATENT DOCUMENTS 141109 11/1979 Japan .................. 427/132

Primary Examiner—John J. Zimmerman
Attorney, Agent, or Firm—Fitzpatrick, Cella, Harper & Scinto

[57] ABSTRACT

A magnetic recording medium is formed by disposing on a substrate a magnetic recording layer comprising a vertically magnetizable film of Co alone or a Co alloy, or Fe alone or a ferromagnetic Fe alloy. The lubricity, wear resistance and corrosion resistance of the magnetic recording medium are improved by forming an upper layer of Co oxide on the magnetic recording layer. The upper layer per se can be a magnetizable film, particularly a vertically magnetizable film.

14 Claims, 3 Drawing Sheets

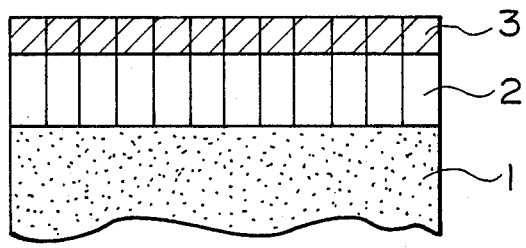
F I G. 1
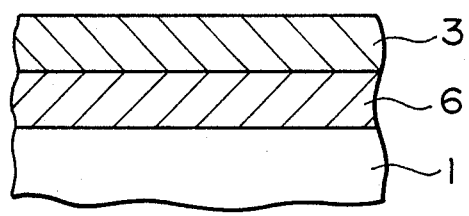
F I G. 2

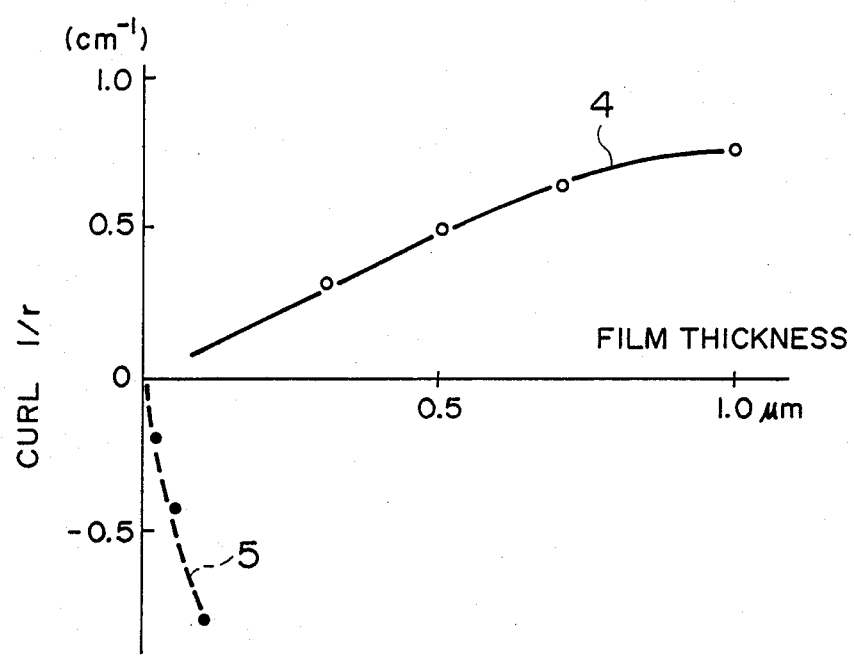
F I G. 3
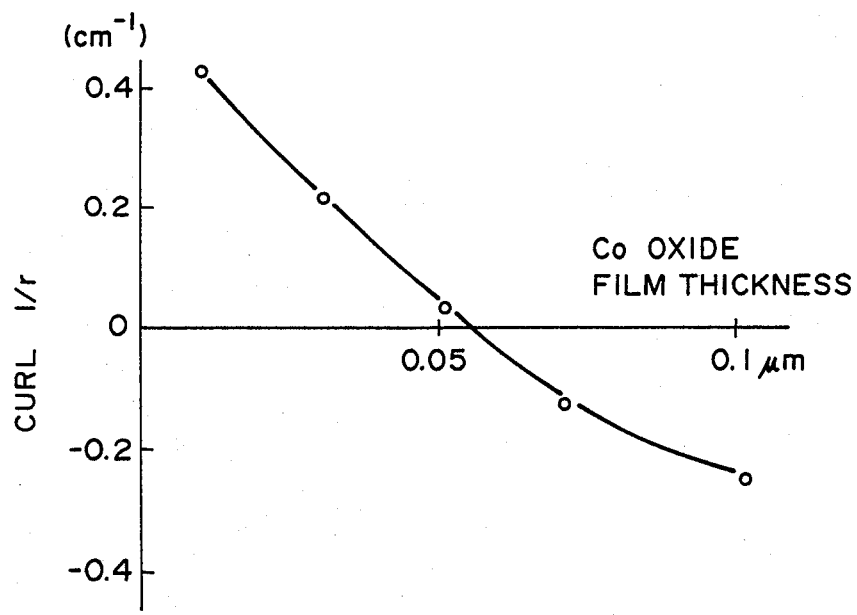
F I G. 4.

MAGNETIC RECORDING MEDIUM

FIELD OF THE INVENTION AND RELATED ART

The metal film-type magnetic recording medium obtained by forming a ferromagnetic metal film by the film deposition technique on a non-magnetic substrate ordinarily of a plastic film or sheet has recently called much attention as a high recording density medium, because a thin magnetic recording layer having a higher magnetic flux density and a higher coercivity can be easily formed compared with the so-called "coating-type" magnetic recording medium having a coating layer wherein ferromagnetic powder is dispersed in a polymer binder.

As a magnetic recording layer of the metal film type medium, a film of a Co-based alloy such as Co-Ni alloy has frequently been used because of large crystalline anisotropy and coercive force and also of relatively large corrosion resistance. Relatively inexpensive Fe alone or a ferromagnetic alloy containing Fe (hereinafter inclusively referred to as "Fe-based magnetic metal") is extremely susceptible to oxidation when formed in a film and has involved a problem in respect of corrosion resistance of a magnetic layer, while it is superior to the above mentioned Co-based alloy in respect of saturation flux density (hereinafter simply referred to as "Bs") which is an important magnetic property as well as a coercive force (hereinafter simply referred to as "He").

By the way, when the recording system is considered, the magnetic recording media may be classified into those adapted for the vertical or perpendicular magnetization recording system and the longitudinal or parallel magnetization recording system. The vertical magnetization system, when compared with the conventional longitudinal magnetization system, is capable of providing an extremely increased recording density and therefore the practical use thereof is extremely important for development of the magnetic recording. As recording media for the vertical magnetization system, Co-based metals represented by Co and Co-Cr alloy and Ba-ferrite have been developed.

The Ba-ferrite medium comprises a coating layer of Ba-ferrite powder dispersed in a binder formed on a substrate and has an advantage that it can be produced through the methods for producing conventional recording media. The Ba-ferrite medium, however, involves a defect that it has a small Bs (saturation flux density).

On the other hand, a vertically magnetizable film of Co or Co-alloy formed by the film deposition process including the vacuum evaporation process, the sputtering process, the plating process, etc., has a larger Bs than the Ba-ferrite layer and is therefore capable of realizing a higher recording density by that much. While the Co or Co-alloy film has excellent magnetic properties, it involves an obstacle to the commercialization thereof that it is poor in wear or abrasion resistance.

In the meantime, as a measure for improving the corrosion resistance of a magnetic recording layer, it has been considered to provide a corrosion-resistant protective layer of a corrosion-resistant metal such as Cr, V or Ni, or an oxide such as $Al_2O_3$ or $SiO_2$. Such a protective layer of corrosion resistant metal or oxide as described above however requires a certain thickness in order to exhibit a sufficient corrosion resistance so that the reproduction efficiency is lowered due to spacing loss. This is particularly pronounced in a shorter wavelength side. Further, the above described class of protective film does not provide a good lubricity or wear resistance so that it has not been commercially used.

In order to improve the wear resistance of a magnetic recording layer, it has been considered to deposit an organic lubricating material such as a metal soap, an aliphatic acid ester or perchloropolyether on the magnetic recording layer, whereas a protective lubricating material showing a sufficient durability has not been found.

SUMMARY OF THE INVENTION

An object of the present invention is to provide a magnetic recording medium having excellent durability inclusive of corrosion resistance, lubricity and wear resistance.

Another object of the present invention is to provide a magnetic recording medium adapted to high density recording.

According to the present invention, there is provided a magnetic recording medium, comprising: a substrate, a magnetic recording layer and an upper layer of Co (cobalt) oxide disposed in laminated form in the order named; the magnetic recording layer comprising a vertically magnetizable film of Co alone or a Co alloy, or Fe (iron) alone or a ferromagnetic alloy containing Fe.

The above mentioned and other objects and features of the invention will be better understood upon consideration of the following detailed description concluding with specific examples of practice and taken in conjunction with the accompanying drawings. In the description appearing hereinafter, "%" referring to a composition is by weight unless otherwise noted specifically.

BRIEF DESCRIPTION OF THE DRAWINGS

FIGS. 1 and 2 are respectively a partial sectional view of an embodiment of the magnetic recording medium according to the present invention;

FIG. 3 is a graph showing the degree of curl of a PET (polyethylene terephthalate) film coated with a Co-Cr film and a Co-oxide film as a reference example;

FIG. 4 is a graph showing the degree of curl of a magnetic recording medium according to an Example of the present invention.

DETAILED DESCRIPTION OF THE INVENTION

Figure 5:
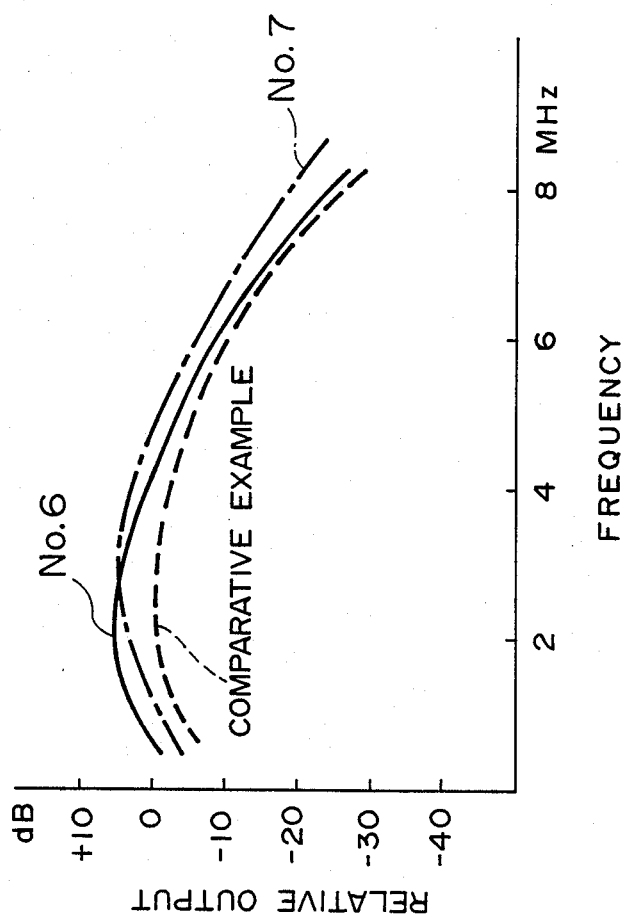
FIG. 5 is a graph showing reproduction output frequency characteristics of magnetic tapes according to Example 5, Example 6 and Comparative Example.

FIG. 1 shows a magnetic recording medium comprising a substrate 1, a vertically magnetizable magnetic recording layer 2 on the substrate, and an upper layer 3 of Co oxide formed on the magnetic recording layer 2. The magnetic recording layer 2 comprises a vertically magnetizable film of Co or a Co alloy formed by vacuum evaporation, sputtering, ion plating, or wet plating on the substrate 1. As ferromagnetic metal films forming vertically magnetizable films, i.e., ferromagnetic metal films having an easily magnetizable direction substantially perpendicular to the film surface, there have been known those of Co, Co-Cr, Co-V, Co-Mo, Co-W, Co-Cr-Pd, Co-Cr-Mo, Co-Cr-Rb, etc. Among these, a Co-Cr film has a particularly large vertical magnetic anisotropy and is relatively easily formed as a vertically magnetizable film. For this reason, the magnetic recording layer 2 is desirably formed of Co-Cr. The magnetic recording layer 2 may be formed in a thickness of, e.g., 0.1 to 2 μm directly on the substrate 1 or alternatively on the substrate 1 through an intermediate layer of a metal film of Ti, Bi, Ge, etc. or an amorphous film of $SiO_2$, Co-Zr, Co-Si-Br, etc. Such an intermediate layer can show a function of, e.g., improving the orientation of the magnetic recording layer 2. Further, there may be formed a high permeability magnetic layer between the substrate 1 and the magnetic recording layer 2 or between the substrate 1 and the above mentioned intermediate layer for the purpose of increasing the recording efficiency or increasing the reproduction output.

The upper layer 3 of a Co oxide may be formed on the vertically magnetizable 2 by sputtering of a Co target in an inert gas atmosphere containing a prescribed pressure of oxygen or by effecting vacuum evaporation or ion plating of Co as the evaporation source in a dilute oxygen atmosphere. The upper layer 3 is very excellent in lubricity and wear resistance so that the head touch and running or feeding characteristic of the magnetic recording medium can be remarkably improved. Further, as shown in FIG. 1, the magnetic recording layer 2 has a columnar microstructure grown in the film thickness direction and the upper layer 3 formed thereon has the same columnar structure. As a result, the upper layer 3 is firmly combined with the lower magnetic recording layer 2 in structure and provides a magnetic recording medium having an extremely good durability.

The upper layer 3 comprising Co oxide may be formed by sputtering or vacuum evaporation and changes its magnetic property from ferromagnetism to non-magnetism and also changes its coercivity Hc depending on the amount of oxygen contained in the atmosphere for formation thereof. The amount of oxygen to be contained in the atmosphere for formation of the upper layer 3 varies depending on a particular apparatus to be used. Thus, the upper layer 3 may be produced in an inert gas atmosphere containing 5 to 50% of oxygen with respect to the partial pressure of the inert gas in the case of sputtering or a dilute oxygen atmosphere at a pressure of the order of $10^{-3}$ Torr in the case of vacuum evaporation. In either method, the oxygen content in the resultant upper layer naturally increases as the oxygen content in the formation atmosphere increases. The oxygen content in the thus formed upper layer is much smaller than that contained in CoO detectable by X ray diffraction and cannot be readily quantitatively measured. Generally speaking, however, as the oxygen content in the upper layer increases, the saturation flux density Bs tends to decrease. Further, as the incident angle of the evaporated particles becomes close to a vertical against the substrate, a vertically magnetizable layer can be readily formed. On the other hand, as the incident angle increases, a longitudinally magnetizable layer is readily formed. The magnetic properties of the upper layer affect the lower magnetic recording layer 2. For this reason, the thickness of the upper layer 3 should be determined depending on the oxygen content in the upper layer 3 so that the layer 3 does not hinder the recording and reproduction characteristic of the magnetic recording layer 2. More specifically, a longitudinally magnetizable upper layer 3 containing little oxygen has a large saturation flux density Bs and a small Hc so that it functions as a magnetic shield layer against the lower magnetic recording layer 2. Therefore, where an upper layer 3 having an Hc of the order of 300 Oe or below and a large Bs is disposed on or above the magnetic recording layer 2, the thickness of the upper layer 3 should be decreased. Further, the upper layer 3 should preferably have a Bs of 10,000 gauss or below since the improvement in lubricity and wear resistance is little if the oxygen content is too small.

More specifically, when the saturation flux density is represented by $Bs_1$, the coercivity by $Hc_1$ and the thickness by $\delta_1$ for the lower magnetic recording layer 2, and the saturation flux density is represented by $Bs_2$, the coercivity by $Hc_2$ and the thickness by $\delta_2$ for the upper layer 3, the $\delta_2$ should desirably be selected so as to satisfy the following relationship:

$$\delta_1 Bs_1/Hc_1 > \delta_2 Bs_2/10/Hc_2.$$

If the upper layer 3 contains too much oxygen and is non-magnetic or has a very small Bs, the upper layer 3 functions as a spacing between the lower magnetic recording layer 2 and a magnetic head. This influence is pronounced particularly when a high density recording is aimed at as in the magnetic recording medium according to the present invention. For this reason, the thickness of the upper layer 3 should preferably be 1/10 or less, further preferably 1/30 or less, of the minimum wavelength of a recording signal range. If the upper layer 3 is too thin, it cannot show sufficient effects in respect of lubricity, wear resistance and durability. The upper layer 3 should preferably have a thickness of at least 50 Å. The upper limit for the thickness is not very significant but may generally be of the order of 0.5 μm.

If the upper layer 3 is formed as a vertically magnetizable film, the upper layer 3 functions as a magnetic recording layer like the magnetic recording layer 2 so that the thickness of the upper layer 3 can be thick and free of the restriction as described above. A vertically magnetizable upper layer 3 can be obtained by effecting evaporation or sputtering of Co in a certain reduced pressure range of oxygen atmosphere or in an inert gas atmosphere containing oxygen in a certain range of proportion in such a manner that the evaporated particles are incident on the substrate 1 at a substantially perpendicular initial incident angle with respect to the substrate 1. The oxygen partial pressure providing a vertically magnetizable upper layer 3 depends on a certain production process or apparatus used. In general, however, a vertically magnetizable film may be relatively easily formed in an oxygen atmosphere at a pressure of the order of $10^{-3}$ Torr for the evaporation process or in an inert gas atmosphere at a total pressure of, e.g., $10^{-4}$ to $10^{-1}$ Torr containing oxygen in a proportion of 10-20% with respect to the partial pressure of the inert gas for the sputtering process. The thus formed vertically magnetizable upper layer 3 has a Bs of generally 1000-6000 gauss and an Hc of generally 150 to 1200 Oe. It is preferred that the upper layer 3 has magnetic properties not remarkably different from those of the magnetic recording layer 2 and, more specifically, it is preferred that both Bs and Hc of the upper layer 3 are of the same order as those of the magnetic recording layer 2 in view of recording and reproduction characteristics.

The lubricating effect of the upper layer 3 depends on the surface unevenness thereof. If the surface unevenness is 0.005 μm or larger in terms of an average of ten measured values of surface roughness Rz (JIS-B0601), a kinematic coefficient of friction of 0.3 or less is obtained. If the maximum roughness difference in height Rmax between concavity and convexity locally exceeds about 0.05 μm, there occurs a drop-off of a signal at that place. More specifically, Rz is obtained by measuring 5 roughnesses (or local differences in height) for a prescribed length (1 mm) of magnetic recording medium or tape by a roughness meter (Talystep mfd. by Taylor Hobson) and averaging ten measured values selected from all the measured values in order of magnitude. The maximum roughness Rmax is obtained as the maximum value among the thus selected ten measured values. As the surface roughness of the upper layer 3 depends on the surface roughness of the substrate 1, the surface roughness of a substrate for the magnetic recording medium according to the present invention should preferably be 0.005 μm or larger in terms of Rz and 0.1 μm or smaller, particularly 0.05 μm or smaller, in terms of Rmax.

The substrate 1 for the magnetic recording medium according to the present invention may generally and preferably be a film having a thickness of the order of 5 to 100 μ comprising polyester, polyimide, polyamide, polysulfone, polyacetate, etc. In addition, those of glass, aluminum, surface-oxidized aluminum, etc., may also be used for the substrate 1 as desired. Basically, the substrate 1 may comprise any non-magnetic solid material providing a desired surface for forming a magnetic recording layer thereon.

It has been further found that the lamination of the magnetic recording layer 2 and the upper layer 3 on a polymer film as a substrate 1 provides a magnetic recording medium having remarkably small tendency of curling. This may be attributable to the facts that the formation of a Co or Co alloy film on a film of a polymer such as polyester, polyimide or polyamide provides a laminated film generally curling with the metal film inside, whereas the formation of a Co oxide film on a polymer film provides a laminated film curling with the Co oxide film outside.

While the above described embodiment of the magnetic recording medium of the present invention comprises a vertically magnetizable film of Co alone or a Co alloy as the magnetic recording layer, an Fe-based magnetic metal layer may also be used as a magnetic recording layer. The Fe-based magnetic metal provides large Bs and He, particularly a large Bs.

In the case where an Fe-based metal layer is used as a magnetic recording layer 2, it is preferred that an upper layer 3 as shown in FIG. 1 also functions as a magnetic recording layer in order to prevent a spacing loss and to provide improved recording and reproduction characteristics. If the upper layer functions as a magnetic recording layer, the upper layer can be formed in a reliably large thickness so that a magnetic recording medium having further improved corrosion resistance and wear resistance can be provided.

Hereinbelow, a case where an upper layer of a Co oxide also functions as a magnetic recording layer will be explained.

A magnetic recording layer according to the present invention shown in FIG. 2 comprises a substrate 1, and a magnetic recording layer 6 of an Fe-based magnetic metal and an upper layer 3 of a ferromagnetic Co oxide. As the magnetic recording layer 6 magnetically interacts with a magnetic head through the upper layer 3, the decrease in recording and reproduction efficiency thereof is marked on the shorter wavelength side. For this reason, it is important for the magnetic recording layer 6 to show good recording and reproduction characteristics on the longer wavelength side.

The Fe-based magnetic metal may be Fe alone or a Fe-containing alloy such as Fe-Co, Fe-Ni, Fe-Mn, Fe-Cr, Fe-V, Fe-Cu, Fe-Ti, Fe-Co-Ni, Fe-Co-B, Fe-Co-Cr or Fe-Co-V.

An Fe-alloy containing a smaller amount of Fe has a lower Bs and is disadvantageous also in respect of a material cost, the Fe-based magnetic metal should preferably be Fe alone or a ferromagnetic alloy containing 25% or more of Fe. More preferably, the Fe-based metal may have a composition around an alloy of Fe 60 atomic %-Co 40 atomic % which provides the maximum Bs or, more specifically, may be an alloy comprising 20 to 60 atomic % of Co and the remainder of Fe in view of the magnetic properties. It is not excluded that a further minor quantity of additive is contained as desired.

The magnetic recording layer 6 may be formed as a film of about 0.05 to 2 μm in thickness on the substrate 1 by a method similar to those used for the formation of the magnetic recording layer 2 shown in FIG. 1 inclusive of vacuum evaporation, ion plating, sputtering, etc.

On the other hand, the upper layer 3 is formed as a Co oxide film on the magnetic recording layer 2. As described before, the upper layer 3 also functions as a magnetic recording layer for itself, so that the thickness thereof is not limited to a small value as is the case with a non-magnetic protective layer. A larger thickness should rather be preferred in order to improve the reliability with respect to corrosion resistance. Thus, a thickness of the order of 0.01 to 0.5 μm, particularly 0.05 to 0.2 μm, is preferred.

Similarly as explained with reference to an embodiment shown in FIG. 1, the upper layer 3 may be formed by vacuum evaporation or ion plating of Co in the presence of diluted oxygen or by sputtering of Co in an inert gas atmosphere containing oxygen. The magnetic properties of the upper layer 3 comprising Co oxide depends on the oxygen partial pressure in the atmosphere for formation thereof. Further, the conditions for the film formation depend on the capacity of a film formation apparatus, a gas withdrawal speed, a film formation speed, etc., and may not be determined in a single way. Ordinarily, however, a Co oxide film having excellent magnetic properties may be obtained by vacuum evaporation containing oxygen at a partial pressure of about $10^{-3}$ to $10^{-2}$ Torr or by sputtering in an inert gas atmosphere containing 5 to 16% partial pressure of oxygen.

The upper layer 3 is placed in a position to face a magnetic head and the recording and reproduction characteristics on the shorter wavelength side thereof are important. Thus, the upper layer 3 should preferably show a Bs of 2000 gauss or larger and an Hc of 300 Oe or larger, particularly an Hc of 500 Oe or larger.

An upper layer 3 of Co oxide showing a Bs of about 5000 gauss or below may be formed as a vertically magnetizable layer if the film formation is carried out under a condition that the evaporated particles are incident on the substrate 1 almost perpendicularly. The thus formed vertically magnetizable film shows excellent recording and reproduction characteristics on the shorter wavelength side and, in the present invention, is combined with magnetic recording layer 6 having a large Bs to provide a large reproduction output for a wide wavelength range, i.e., for a wide frequency range, as described hereinafter.

Further, in the embodiment of the magnetic recording medium shown in FIG. 2, a thin intermediate layer of, e.g., SiO$_2$, or another layer may be interposed in a thickness of, e.g., 0.1 μm or below between the magnetic recording layer 2 and the upper layer 3.

The magneric recording medium according to the present invention may be preferably produced in a good productivity when a continuous vapor deposition apparatus having two vapor deposition rooms is used and the magnetic recording layer 2 or 6 and the upper layer 3 are produced successively.

The magnetic recording medium according to the present invention can assume an arbitrary form inclusive of a disk, sheet, tape or card and may be suitably adapted to a use wherein a corrosion-resistant and wear-resistant protective layer is desired on the magnetic recording layer.

As has been described hereinabove, by providing an upper layer of a Co oxide on a magnetic recording medium having a magnetic recording layer comprising a vertically magnetizable film of Co or a Co alloy or a Fe-based magnetic metal film, the wear resistance and the corrosion resistance of the magnetic recording medium are remarkably improved. Further, when the upper layer of Co oxide per se is made a magnetic recording layer, a spacing loss in avoided to provide an excellent magnetic recording medium for high density recording. Furthermore, if the upper layer of Co oxide is formed as a vertically magnetizable film, it increases a reproduction output on the shorter wavelength (high frequency) side, so that a magnetic recording medium further adapted for high density recording and broad range of recording is provided.

Hereinbelow, the present invention will be explained with reference to experimental examples.

EXAMPLE 1

A 40 μm-thick polyimide film was used as a substrate, a film having a composition of 80 wt. % Ni-20 wt. % Fe was formed thereon by sputtering in a thickness of 0.5 μm, and a vertically magnetizable film having a composition of 80 wt. % Co-20 wt. % Cr was formed further thereon in a thickness of 0.3 μm. On the Co-Cr film was further formed a Co oxide film by sputtering of Co in an Ar gas atmosphere containing 18% of oxygen. The Co oxide film showed no spontaneous magnetization, thus being nonmagnetic, as a result of measurement by means of a vibrating sample type magnetometer with respect to a Co oxide film formed under the same conditions directly on a polyimide film.

In the manner as described above, floppy or flexible disk samples No. 1 to No. 5 respectively having Co oxide films of 0, 0.005, 0.01, 0.03 and 0.1 μm, respectively, in thickness. The recording and reproduction characteristics and the durability of the thus obtained floppy disks were measured by using a one-side access type vertical head.

Table 1 shown below summarizes the results of the measurement of D$_{50}$ and durability. The D$_{50}$ value was measured as a recording density (or frequency) at which the reproduction output reached 50% of the maximum output level in the reproduction output frequency characteristic curve. The durability of a floppy disk was evaluated in terms of a number of passes until 3dB or more of decrease in output or flaw occurs.

TABLE 1

| Disk No. | Thickness of Co oxide film | Durability (passes) | D$_{50}$ |
|---|---|---|---|
| 1 | 0 | 10,000 | Unmeasurable |
| 2 | 0.005 μm | 120,000 | 90 KBPI |
| 3 | 0.01 μm | 750,000 | 70 KBPI |
| 4 | 0.03 μm | >1,000,000 | 48 KBPI |
| 5 | 0.1 μm | >1,000,000 | 31 KBPI |

As shown in the above table, the disk No. 1 having no Co oxide film caused wearing of the magnetic recording layer immediately after the head contact and became unusable after about 10,000 passes. The disks No. 4 and No. 5 each having a sufficient thickness of Co oxide layer did not cause output change even after a million passes and were found to be very excellent in durability. The disks Nos. 2 and 3 caused output change after 120,000 passes and 750,000 passes, respectively, and were rather inferior in durability to the disks Nos. 4 and 5. Neither of these disks, however, caused such a serious damage that the magnetic layer was scraped or scratched as was observed for the disk No. 1. On the other hand, as the thickness of the Co oxide film increased, the short wavelength recording capability represented by D$_{50}$ was decreased. Accordingly, the thickness of the Co oxide layer should be determined while taking both recording wavelength and the durability into consideration.

REFERENCE EXAMPLE

Films of 80 wt. % Co-20 wt. % Cr were formed in different thicknesses respectively by sputtering on a 50 μm-thick polyethylene terephthalate (PET) film. Separately, Co oxide films were formed in different thicknesses respectively by sputtering on the PET film. The degrees of curl or warp of the thus formed laminate films are plotted versus the thicknesses of the deposited films in FIG. 3. The curl is indicated by the reciprocal of curvature radius (γ), while a plus (+) value indicates that a laminate curls with the deposited film inside and a minus (−) value indicates that a laminate curls with the deposited film outside.

EXAMPLE 2

On a 50 μm-thick PET film was formed a vertically magnetizable film of 80 wt. % Co-20 wt. % Cr in a thickness of 0.5 μm, on which was further formed a Co oxide film by sputtering of Co in an Ar gas atmosphere containing 16% of oxygen. The Co oxide film was formed in thicknesses of 0.01, 0.03, 0.05, 0.07 and 0.1 μm to provide totally five floppy disk samples. The degrees of curl for these floppy disks are plotted versus the thickness of the Co oxide film in FIG. 4. As shown in FIG. 4, with respect to the disks of this example wherein a 0.5 μ-thick Co-Cr film was used, the laminate disk having a 0.5 μ-thick Co oxide film showed a least degree of curl and was found to be sufficiently flat for a practical use.

A recording and reproduction experiment was conducted by using a floppy disk having no Co oxide film (referred to as "disk No. 6", one before formation of the Co oxide film as described above) and a floppy disk having a 0.05 μm-thick Co oxide film (referred to as "disk No. 7") and by using a ring-type magnetic head. As a result, the floppy disk No. 7 according to the present invention showed a durability of over one million passes and a uniform reproduction output containing little fluctuation in output within one track since the head uniformly contacted the disk. On the other hand, with respect to the disk No. 6 having no Co oxide film, portions of the Co-Cr film showing a large pressure of contact with the head were scraped off in short time due to influence of the curl.

EXAMPLE 3

Floppy disks having the structure which gave least curl in the above Example 2 were produced by using Ar atmospheres containing varying oxygen contents of 18%, 16%, 14% and 12% during the Co oxide film formation. Thus, each disk was prepared by forming a 0.5 μm-thick Co-Cr vertically magnetizable film and a 0.05 μm-thick Co oxide film successively on a 50 μm-thick PET film. The Co-Cr film showed a Bs of 5200 gauss, and an Hc of 580 Oe. The Co oxide films formed in the Ar gas atmospheres containing 18%, 16%, 14% and 12% showed Bs of 0, 1100, 4600 and 7200 gauss, respectively. Judging from results obtained with respect to Co oxide films formed under the identical conditions directly on the PET film, the Co oxide film formed with 14% of oxygen was a vertically magnetizable film, while the other Co oxide films were nonmagnetic or longitudinally magnetizable films.

These floppy disks were subjected to a recording and reproduction test by using a ring head. The results are shown in Table 2 below.

TABLE 2

| Disk No. | Oxygen content (%) | Bs (Gauss) | Hc (Oe) | Magnetizable direction | Output at 50 KBPI | Durability |
| --- | --- | --- | --- | --- | --- | --- |
| 7 | 16 | 1100 | 250 | longitudinal | −73 dBVp − p | >1,000,000 |
| 8 | 18 | 0 | — | — | −72 dBVp − p | >1,000,000 |
| 9 | 14 | 4600 | 870 | vertical | −68 dBVp − p | >1,000,000 |
| 10 | 12 | 7200 | 1100 | longitudinal | −70 dBVp − p | >1,000,000 |

These disks did not show substantial difference in reproduction output at longer wavelength sides. At 50 KBPI, however, the disk No. 9 showed a highest output. The disk No. 9 gave highest outputs at further shorter wavelengths. With respect to durability, no output change or flaw was observed even after one million passes for any of the disks. Thus, when the Co oxide film is a vertically magnetizable film, the short wavelength recording characteristic which is the most important feature of the vertical recording system is not impaired, because the Co oxide film also functions as a magnetic recording layer.

EXAMPLE 4

Five polyimide films No. 1 to No. 5 of 12 μm in thickness and different surface roughnesses were respectively used as a substrate. No. 1 polyimide film showed an average roughness Rz (average of ten measured values) of below measurement limit and a maximum roughness Rmax of 0.02 μm; No. 2 film, Rz of below measurement limit and Rmax of 0.18 μm; No. 3 film, Rz of 0.015 μm and Rmax of 0.039 μm; No. 4 film, Rz of 0.04 μm and Rmax of 0.096 μm; and No. 5 film, Rz of 0.12 μm and Rmax of 0.19 μm, all according to the measurement by Talystep mfd. by Taylor Hobson Co. On each of the polyimide films was formed a 0.42 μm-thick vertically magnetizable film of Co 79 wt. %-Cr 21 wr. % by continuous vacuum evaporation with electron beam heating. Further, a 0.01 μm-thick Co oxide film was formed on the Co-Cr film by electron beam heating of Co in an oxygen atmosphere of 6 milli-Torr to produce totally 5 magnetic recording tapes. The substrate temperature during the evaporation was 200° C.; the Co-Cr film showed a Bs of 4400 gauss and an Hc of 950 Oe; and the Co oxide film formed was nonmagnetic, for all of the magnetic tapes thus obtained.

Table 3 shows the kinetic friction coefficient, and the running property and the number of signal dropout when subjected to recording and reproduction by means of a VHS-type video tape deck. The dropout level $D_1$ indicates 100 or less dropouts/min.; $D_2$, 101 to 1000 dropouts/min.; and $D_3$, more than 1000 dropouts/min.

TABLE 3

| | Film No. | Rz (μm) | Rmax (μm) | Kinematic friction coefficient | Running property | Dropout |
| --- | --- | --- | --- | --- | --- | --- |
| Tape according to the invention | 1 | Nil | 0.02 | 0.37 | *1 | D1 |
| | 2 | Nil | 0.18 | 0.33 | *1 | D3 |
| | 3 | 0.015 | 0.039 | 0.17 | Good | D1 |
| | 4 | 0.04 | 0.096 | 0.18 | Good | D2 |
| | 5 | 0.12 | 0.19 | 0.16 | Good | D3 |
| Comparative Example | 3 | 0.015 | 0.039 | 0.34 | *2 | |

*1 Having a tendency to stick to a drum or a fixed head.
*2 The Co—Cr film was scraped off to provide no output.

As shown in Table 3, a magnetic tape obtained by using a very smooth film having a very small Rz gives a large kinematic friction coefficient and is liable to cause sticking to a head. On the other hand, a tape obtained by using a film having a larger Rz or Rmax has a good running property. Too large a Rz or Rmax causes many dropouts. Thus, the magnetic tapes according to the present invention did not cause degradation of image quality even in 30 minutes of still mode reproduction and were found to have excellent durability, whereas a magnetic tape prepared for comparison without providing a Co oxide film could not continue reproduction because the Co-Cr film was scraped off. Further, the magnetic tape obtained without a Co oxide film showed an extensive curl with the Co-Cr film inside, whereas the tapes according to the invention coated with an upper Co oxide film showed practically sufficient flatness.

EXAMPLE 5

A 0.1 μm-thick metal layer of Fe alone as a magnetic recording layer was formed on one side of a 12 μm- thick PET film as a substrate by a continuous vacuum evaporation apparatus with an electron beam heating system. In this instance, the incident angle of the Fe evaporated particles against the substrate film was restricted to at least 65°.

Further, by causing evaporation of Co in an oxygen atmosphere of $4 \times 10^{-3}$ Torr in the same evaporation apparatus and with the incident angle restricted to the range of 0°–45°, a 0.08 μm-thick Co oxide film layer was formed. The thus produced laminate was slit into a 12.7 mm width to obtain a magnetic tape (No. 6) according to the present invention.

On the other hand, for the sake of comparison, two magnetic tapes were produced, one by forming only the Fe layer and the other by forming only the Co oxide layer, respectively, on the PET film followed by slitting into 12.7 mm.

The thus obtained three types of magnetic tapes were subjected to measurement of magnetic properties and corrosion resistance. Further, the tape No. 6 according to the invention was further subjected to measurement of a kinematic friction coefficient, a still mode durability and a frequency characteristic.

The magnetic properties were measured by using a vibrating sample-type magnetometer. The corrosion test was conducted by placing a magnetic tape sample under constant temperature and constant humidity conditions of 60° C. and a relative humidity of 90%, and by observing the tape surface through an optical microscope to measure a time in which rust has appeared. The still mode durability was tested by using a still mode of a commercially available VTR deck and evaluated in terms of a time in which the reproduction output has decreased to one half of the initial value.

The results are shown in Table 4 appearing hereinafter and the frequency characteristic is shown in FIG. 5.

EXAMPLE 6

By using the same continuous evaporation apparatus as in Example 5, a 0.1 μm-thick metal film of Fe 50%-Co 50% was formed with a minimum incident angle of 60° and then a 0.03 μm-thick intermediate layer of $SiO_2$ on one side of a 9 μm-thick aramide film.

Further, by causing evaporation of Co in an oxygen atmosphere of $5 \times 10^{-3}$ Torr in the same evaporation apparatus and with the incident angle restricted to the range of 0°–45°, a 0.2 μm-thick Co oxide film (upper layer) was formed. The Co oxide film was found to be a vertically magnetizable film which has a larger residual magnetization in the direction vertical or perpendicular to the film than in the longitudinal or parallel direction.

The thus produced laminate was slit into 12.7 mm to obtain a magnetic tape (No. 7) according to the invention.

On the other hand, for the sake of comparison, two magnetic tapes were prepared, one by forming only the Fe-Co magnetic recording layer and the other by forming only the Co oxide film (upper layer), respectively, in the same manner as described above on a 9 μm-thick aramide film followed by slitting into 12.7 mm.

The thus obtained three types of magnetic tapes were subjected to measurement of magnetic properties and corrosion test as in Example 5. Further, the magnetic tape No. 7 according to the invention was similarly further subjected to measurement of a kinematic friction coefficient, a still mode durability, and a frequency characteristic.

The results are also shown in Table 4 and FIG. 5.

TABLE 4

| | | Material | Bs (Gauss) | Hc (Oe) | Direction of easy magnetization | Corrosion resistance (hrs.) | Kinematic friction coefficient | Still mode durability (min.) |
|---|---|---|---|---|---|---|---|---|
| Ex. 5 | Magnetic layer only | Fe | 11000 | 680 | longitudinal | <2 | — | — |
| | Upper layer only | Co oxide | 7200 | 1050 | " | >1000 | — | — |
| | Tape No. 6 | Co oxide/Fe | 9300 | 730 | " | >1000 | 0.28 | >60 |
| Ex. 6 | Magnetic layer only | Fe—Co | 15000 | 700 | " | <5 | — | — |
| | Upper layer only | Co oxide | 4600 | 820 | vertical | >1000 | — | — |
| | Tape No. 7 | Co oxide/Fe | 8100 | 820 | longitudinal + vertical | >1000 | 0.26 | >60 |
| Comp. Ex. | | Co—Ni | 8200 | 930 | longitudinal | <500 | 0.30 | 25 |

As shown in Table 4, the tapes Nos. 6 and 7 according to the present invention showed clearly superior corrosion resistance to the tape having only the magnetic recording layer of Fe or Fe alloy and also showed a remarkable improvement over the tape of the comparative example. Further, the tapes Nos. 6 and 7 showed a rather smaller kinematic friction coefficient to be better in running property and much improvement in still mode durability, respectively, compared with the tape of the comparative example.

Further, as shown in FIG. 5, the magnetic tapes Nos. 6 and 7 according to the invention showed a better reproduction output characteristic over a whole frequency range. Particularly, the tape No. 7 having a vertically magnetizable Co oxide film showed a remarkable improvement in the high frequency region over the tape of the comparative example.

What is claimed is:

1. A contact-type magnetic recording medium comprising a polymer film-type substrate, a magnetic recording layer disposed on said substrate, said magnetic recording layer comprising a vertically magnetizable Co or CO alloy film, and an upper layer of Co oxide disposed on said magnetic recording layer which contacts a recording head for recording and readout, wherein said substrate has a surface unevenness of at least 0.005 microns as determined by an average of ten measured values of surface roughness (JIS-B0601) and a maximum difference in surface height between adjacent concavities and convexities of 0.1 micron or less.

2. A magnetic recording mediun according to claim 1, wherein said magnetic recording layer comprises a metal or alloy selected from the group consisting of Co, Co-Cr, Co-V, Co-Mo, Co-W, Co-Cr-Pd, Co-Cr-Mo and Co, Cr, Rd.

3. A magnetic recording medium according to claim 1, wherein said magnetic recording layer comprises Co-Cr.

4. A magnetic recording medium according to claim 3, wherein said upper layer comprises a vertically magnetizable film.

5. A magnetic recording medium according to claim 1, wherein said upper layer comprises a vertically magnetizable film.

6. A magnetic recording medium according to claim 1, wherein the maximum local difference in height is 0.05 μm or smaller.

7. A magnetic recording medium according to claim 1, wherein the magnetic recording layer has a saturation flux density $Bs_1$, a coercive force $Hc_1$ and a thickness $\delta_1$; and the upper layer has a flux density $Bs_2$, a coercive force $Hc_2$ and a thickness $\delta_2$ satisfying the relationship:

$$\delta_1 Bs_1/Hc_1 > \delta_2 Bs_2/10/Hc_2.$$

8. A magnetic recording medium according to claim 1 wherein the upper layer has a thickness on the order of from 50 Å to 0.5 microns.

9. A contact-type magnetic recording medium comprising a polymer film-type substrate, a magnetic recording layer disposed on said substrate, said magnetic recording layer comprising a vertically magnetizable Fe or Fe alloy film, and an upper layer of Co oxide dispose on said magnetic recording layer which contacts a recording head for recording and readout wherein said substrate has a surface unevenness of a least 0.005 microns as determined by an average to ten measured values of surface roughness (JIS-B0601) and a maximum local difference in surface height between adjacent concavities and convexities of 0.1 micron or less.

10. A magnetic recording medium according to claim 9, wherein said magnetic recording layer comprises a member selected from the group consisting of Fe-Co, Fe-Ni, Fe-Mn, Fe-Cr, Fe-V, Fe-Cu, Fe-Ti, Fe-Co-Ni, Fe-Co-B, Fe-Co-Cr, and Fe-Co-V.

11. A magnetic recording medium according to claim 10, wherein said magnetic recording layer comprises an alloy which alloy comprises 20 to 60 atomic % Co and the remainder Fe.

12. A magnetic recording medium according to claim 11, wherein said alloy comprises about 60 atomic % Fe and 40 atomic % Co.

13. A magnetic recording medium according to claim 9, wherein said magnetic recording layer contains 25% by weight or more of Fe.

14. A magnetic recording medium according to claim 9, wherein said upper layer is a vertically magnetizable film.

* * * * *